(12) United States Patent
Harada et al.

(10) Patent No.: US 11,320,110 B2
(45) Date of Patent: May 3, 2022

(54) VEHICLE LAMP

(71) Applicant: KOITO MANUFACTURING CO., LTD., Tokyo (JP)

(72) Inventors: Tomoaki Harada, Shizuoka (JP); Yoshiro Ito, Shizuoka (JP); Masaya Shido, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/054,815

(22) PCT Filed: May 9, 2019

(86) PCT No.: PCT/JP2019/018541
§ 371 (c)(1),
(2) Date: Nov. 12, 2020

(87) PCT Pub. No.: WO2019/225334
PCT Pub. Date: Nov. 28, 2019

(65) Prior Publication Data
US 2021/0239294 A1      Aug. 5, 2021

(30) Foreign Application Priority Data

May 24, 2018   (JP) .............................. JP2018-099426

(51) Int. Cl.
*F21S 43/145* (2018.01)
*F21S 43/37* (2018.01)
(Continued)

(52) U.S. Cl.
CPC ............ *F21S 43/145* (2018.01); *F21S 43/195* (2018.01); *F21S 43/31* (2018.01); *F21S 43/37* (2018.01); *F21V 23/005* (2013.01)

(58) Field of Classification Search
CPC ......... F21S 41/14–155; F21S 43/14–15; F21S 43/19–195; F21S 43/31–37; F21V 23/003–006
See application file for complete search history.

(56) References Cited

U.S. PATENT DOCUMENTS 5,289,353 A * 2/1994 Sasajima ................ B60Q 1/302
362/368
2016/0245491 A1 * 8/2016 Kim ..................... H05K 1/0274

FOREIGN PATENT DOCUMENTS

JP   2017-027661 A   2/2017
JP   2018-006382 A   1/2018
(Continued)

OTHER PUBLICATIONS

International Search Report dated Jul. 2, 2019 for WO 2019/225334 A1 (5 pages).

*Primary Examiner* — Jason M Han
(74) *Attorney, Agent, or Firm* — Abelman, Frayne & Schwab

(57) ABSTRACT

A vehicle lamp includes: a planar light emitting body including a transparent base body, a light emitting portion disposed inside the base body, and an extraction electrode formed on the base body and configured to supply a current to the light emitting portion; and a flexible printed wiring board including a transparent wiring base, a connection electrode formed on the wiring base and connected to the extraction electrode, and a conductive portion connected to the connection electrode. The extraction electrode and the connection electrode are constituted by a plurality of metal wires respectively arranged at a predetermined interval.

5 Claims, 15 Drawing Sheets

(51) Int. Cl.
*F21S 43/31* (2018.01)
*F21S 43/19* (2018.01)
*F21V 23/00* (2015.01)

(56) References Cited

FOREIGN PATENT DOCUMENTS

WO      2015-098822 A     7/2015
WO      2017-187913 A     11/2017

\* cited by examiner

VEHICLE LAMP

CROSS REFERENCE TO RELATED APPLICATIONS

This application is a national phase of PCT application No. PCT/JP2019/018541, filed on 9 May 2019, which claims priority from Japanese patent application No. 2018-099426, filed on 24 May 2018, all of which are incorporated herein by reference.

TECHNICAL FIELD

The present disclosure relates to a technical field of a vehicle lamp including a planar light emitting body.

BACKGROUND

There is a vehicle lamp using a planar light emitting body such as an organic electroluminescence panel (organic EL panel) as a light source (see, e.g., Patent Document 1). Since a planar light emitting body such as an organic electroluminescence panel is thin and capable of irradiating a wide range of light, development of a vehicle lamp using a planar light emitting body is progressing.

Such a planar light emitting body is used, for example, by being disposed in a lamp chamber, which is an internal space formed by a lamp housing and a cover, or by being attached to a vehicle window, which is a transparent body.

PRIOR ART DOCUMENT

Patent Document

Patent Document 1: Japanese Laid-Open Patent Publication No. 2018-006382

SUMMARY OF THE INVENTION

Problem to be Solved

By the way, in the vehicle lamp including a planar light emitting body, the light emitting surface of the planar light emitting body is transparent or substantially transparent. However, since a part of an extraction electrode provided on the outer periphery of the planar light emitting body and configured to supply a current to the light emitting portion or a part of a flexible printed wiring board connected to the extraction electrode is not transparent, when viewed from outside when the vehicle is turned off, the non-transparent portion is noticeable, which may reduce the invisibility.

Particularly, in a case where the planar light emitting body is used by being attached to the transparent body such as a window or by being disposed along the inner surface of the transparent body, for example, when the passenger of the vehicle sees the outside of the vehicle through the window or see through the window from the outside of the vehicle when the vehicle is turned off, the non-transparent portion is in the field of view, which causes inconvenience that the visibility is reduced.

Therefore, the present disclosure is to solve the above inconvenience and to promote improvement in the invisibility.

Means to Solve the Problem

First, a vehicle lamp related to the present disclosure includes: a planar light emitting body including a transparent base body, a light emitting portion disposed inside the base body, and an extraction electrode formed on the base body and configured to supply a current to the light emitting portion; and a flexible printed wiring board including a transparent wiring base, a connection electrode formed on the wiring base and connected to the extraction electrode, and a conductive portion connected to the connection electrode. The extraction electrode and the connection electrode are constituted by a plurality of metal wires respectively arranged at a predetermined interval.

Therefore, the extraction electrode and the connection electrode are respectively constituted by a plurality of metal wires arranged at a predetermined interval, and thus, the extraction electrode and the connection electrode are less noticeable.

Second, in the vehicle lamp related to the present disclosure, when a distance from a viewer to the extraction electrode or the connection electrode is set to L, a transmittance required in the planar light emitting body or the flexible printed wiring board is set T, and the distance L and the transmittance T are respectively set to a predetermined value, in at least one of the extraction electrode or the connection electrode, a wire width x of the metal wire and an interval y between the metal wires may have values that satisfy following Conditional Expression (1) and Conditional Expression (2):

$$x \leq L/4250 \qquad (1)$$

$$y \geq Tx/(100-T) \qquad (2)$$

Here, L, x, and y are in unit of mm, and T is in unit of %.

Therefore, the wire width of the metal wire of the extraction electrode is set to be equal to or less than the resolution of the eyes of viewer, and thus, the extraction electrode is not recognized by the viewer.

Third, in the vehicle lamp related to the present disclosure, in both of the extraction electrode and the connection electrode, the wire width x of the metal wire and the interval y between the metal wires have values that satisfy Conditional Expression (1) and Conditional Expression (2).

Therefore, in both of the extraction electrode and the connection electrode, it is possible to increase the transparency of both of the extraction electrode and the flexible printed wiring board by calculating the wire width x and the interval y using Conditional Expression (1) and Conditional Expression (2).

Fourth, another vehicle lamp related to the present disclosure includes: a planar light emitting body including a transparent base body, a light emitting portion disposed inside the base body, and an extraction electrode formed on the base body and configured to supply a current to the light emitting portion; and a flexible printed wiring board including a transparent wiring base, a connection electrode formed on the wiring base and connected to the extraction electrode, and a conductive portion connected to the connection electrode. The conductive portion is provided inside the wiring base and is constituted by a plurality of metal wires arranged at a predetermined interval in a direction orthogonal to a thickness direction of the wiring base. The metal wire is formed in a shape having a longitudinal direction and a transverse direction in a cross-sectional shape orthogonal to an extending direction. The longitudinal direction of the metal wire is aligned with the thickness direction of the wiring base.

Therefore, the conductive portion is constituted by the plurality of metal wires arranged at a predetermined interval and the visible range of the conductive portion in the flexible printed wiring board is decreased, and thus, the flexible printed wiring board is less noticeable.

Fifth, in the vehicle lamp related to the present disclosure, the metal wire may be divided into a plurality of portions in the longitudinal direction.

Therefore, each divided portion of the metal wire is disposed side by side in the thickness direction of the wiring base and the direction orthogonal to the thickness direction.

Sixth, in the vehicle lamp related to the present disclosure, when a distance from a viewer to the conductive portion is set to L, a transmittance required in the flexible printed wiring board is set T, and the distance L and the transmittance T are respectively set to a predetermined value, in the conductive portion, a wire width x of the metal wire and an interval y between the metal wires have values that satisfy following Conditional Expression (1) and Conditional Expression (2):

$$x \leq L/4250 \qquad (1)$$

$$y \geq Tx/(100-T) \qquad (2)$$

Here, L, x, and y are in unit of mm, and T is in unit of %.

Therefore, the wire width of the metal wire of the conductive portion is set to be equal to or less than the resolution of the eyes of viewer, and thus, the conductive portion is not recognized by the viewer.

Effect of the Invention

According to the present disclosure, since the extraction electrode and the connection electrode are constituted by a plurality of metal wires arranged at a predetermined interval, respectively, or the conductive portion is constituted by a plurality of metal wires arranged at a predetermined interval and the visible range of the conductive portion in the flexible printed wiring board is decreased, the extraction electrode and the connection electrode, or the flexible printed wiring board is less noticeable, which may promote improvement in the invisibility of the vehicle lamp.

DETAILED DESCRIPTION TO EXECUTE THE INVENTION

Hereinafter, an embodiment for implementing a vehicle lamp of the present disclosure will be described with reference to the accompanying drawings.

In the following embodiments, the vehicle lamp of the present disclosure is applied to a vehicle lamp such as a tail lamp disposed on the inner surface side of the rear window of the vehicle. The present disclosure may be widely applied to various vehicle lamps such as a head lamp, a clearance lamp, a turn signal lamp, a stop lamp, a daytime running lamp, a cornering lamp, a hazard lamp, a position lamp, a back lamp, a fog lamp, or a combination lamp which is a combination thereof.

In the descriptions below, the front-rear, up-down, and left-right directions are illustrated with the light emission direction from the vehicle lamp as the rear. However, the front-rear, up-down, and left-right directions illustrated in the following are for convenience of explanation, and the implementation of the present disclosure is not limited to these directions. Further, in the following, an example of the vehicle lamp in which an organic electroluminescence panel is used as a planar light emitting body is illustrated, but an organic electroluminescence panel also includes an organic electroluminescence display that displays characters and figures. Further, the planar light emitting body used in the present disclosure is not limited to an organic electroluminescence panel, and, for example, another planar light emitting body other than an organic electroluminescence panel, such as a planar light emitting body in which a light emitting diode (LED) is used as a light source may be used.

[Overall Configuration of Vehicle Lamp]

First, an overall configuration of a vehicle lamp 1 will be described (see FIGS. 1 to 3).

Figure 1:
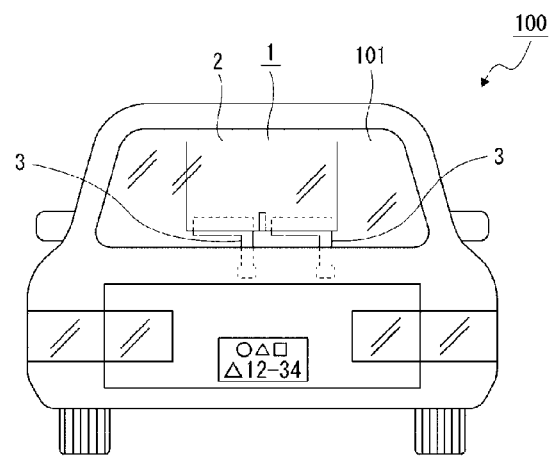
FIG. 1 illustrates an embodiment of a vehicle lamp of the present disclosure together with FIGS. 2 to 26, and is a rear view illustrating a state where the vehicle lamp is disposed at a vehicle body.

The vehicle lamp 1 is disposed, for example, on the inner surface side of a rear window 101 of a vehicle 100 (see FIG. 1). The vehicle lamp 1 may be attached to the inner surface of the rear window 101, or may be disposed in a state of having a constant interval from the inner surface of the rear window 101. The vehicle lamp 1 is positioned, for example, corresponding to the central portion of the rear window 101.

Figure 2:
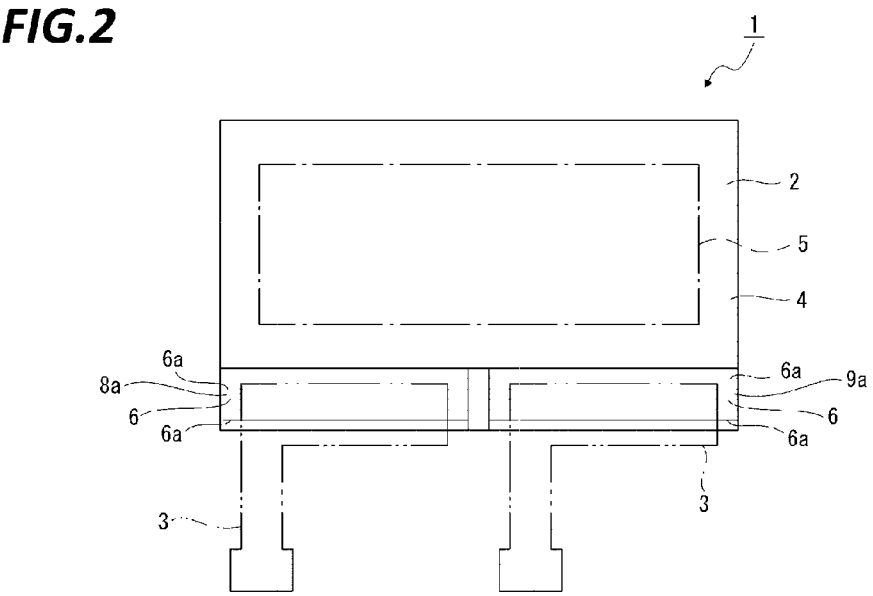
FIG. 2 is a front view of the vehicle lamp.
Figure 3:
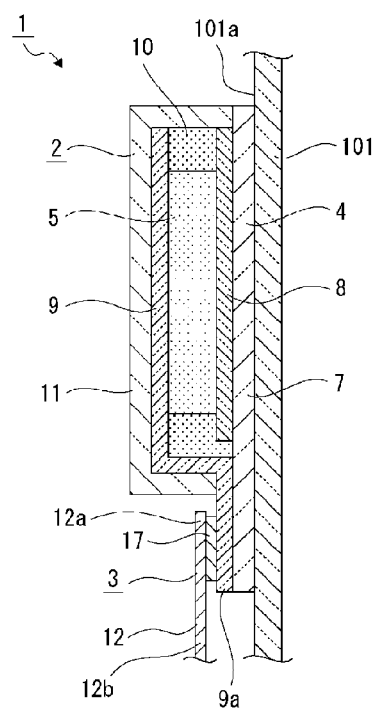
FIG. 3 is a cross-sectional view of the vehicle lamp.

The vehicle lamp 1 includes a planar light emitting body 2 and flexible printed wiring boards 3 and 3 (see FIGS. 2 and 3).

The planar light emitting body 2 is, for example, an organic electroluminescence panel (organic EL panel), and is formed in, for example, a substantially rectangular shape that is horizontally long. The planar light emitting body 2 includes a transparent base body 4, a light emitting portion 5 disposed inside the base body, and extraction electrodes 6 and 6 configured to supply a current to the light emitting portion 5.

The base body 4 includes a transparent substrate 7, an anode 8, and a cathode 9. The transparent substrate 7 is positioned to the rearmost side of the planar light emitting body 2, and, for example, the outer periphery thereof is fixed to an inner surface 101a of the rear window 101 by, for example, an adhesive tape (not illustrated). The anode 8 is stacked on the front surface of the transparent substrate 7, and has an outer shape smaller than that of the transparent substrate 7. For example, a transparent electrode such as indium tin oxide (ITO) is used as the anode 8. The cathode 9 has an outer shape smaller than that of the transparent substrate 7, and a part thereof is stacked on the front surface of the transparent substrate 7, and the other part thereof is positioned in front of the anode 8 in a state of facing the anode 8. For example, a transparent electrode such as ITO is used as the cathode 9.

The light emitting portion 5 is an organic material layer (organic EL layer) stacked between the anode 8 and the cathode 9. An insulating layer 10 is disposed on the outer peripheral side of the light emitting portion 5, and the insulating layer 10 is stacked between the anode 8 and the cathode 9.

In the planar light emitting body 2, a portion excluding a part of the anode 8, a portion excluding a part of the cathode 9, the light emitting portion 5, and the insulating layer 10 are sealed with a sealing member 11. The lower end portion of the anode 8 is disposed in the lower end portion of the transparent substrate 7, and is provided as an electrode forming portion 8a protruding downward from the sealing member 11. The lower end portion of the cathode 9 is disposed in the lower end portion of the transparent substrate 7, and is provided as an electrode forming portion 9a protruding downward from the sealing member 11. The electrode forming portion 8a and the electrode forming portion 9a are positioned to be spaced apart from each other in the left-right direction, the electrode forming portion 8a is disposed in a substantially half portion of one side of the transparent substrate 7 in the left-right direction, and the electrode forming portion 9a is disposed in a substantially half portion of one side of the transparent substrate 7 in the left-right direction.

Figure 4:
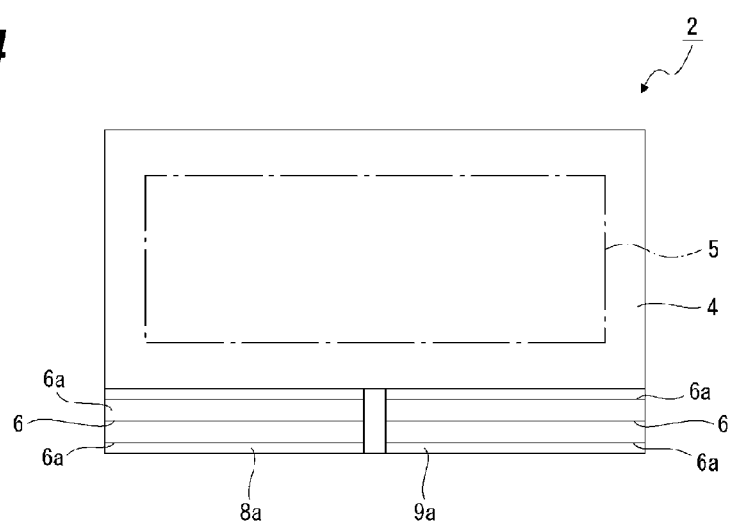
FIG. 4 is a front view of a planar light emitting body.

The extraction electrodes 6 and 6 are formed on the electrode forming portions 8a and 9a, respectively. The extraction electrodes 6 and 6 have a function of supplying a current to the light emitting portion 5 via the anode 8 or the cathode 9. The extraction electrode 6 is constituted by a plurality of colored metal wires 6a, 6a, . . . arranged at a predetermined interval. The metal wires 6a, 6a, . . . are formed, for example, as parallel lines extending in the left-right direction (see FIG. 4). The intervals between the metal wires 6a, 6a, . . . are arbitrary, and may be evenly spaced or unequally spaced. For example, a transparent electrode such as ITO may be used as the extraction electrode 6.

Figure 5:
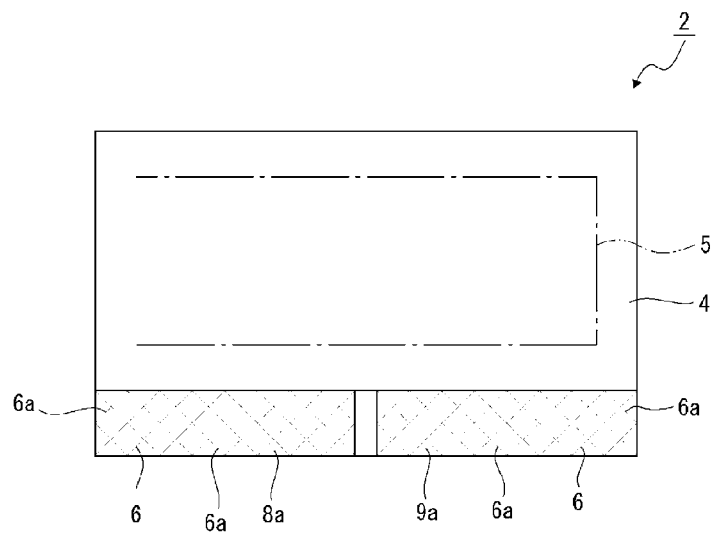
FIG. 5 is a front view of another planar light emitting body.
Figure 6:
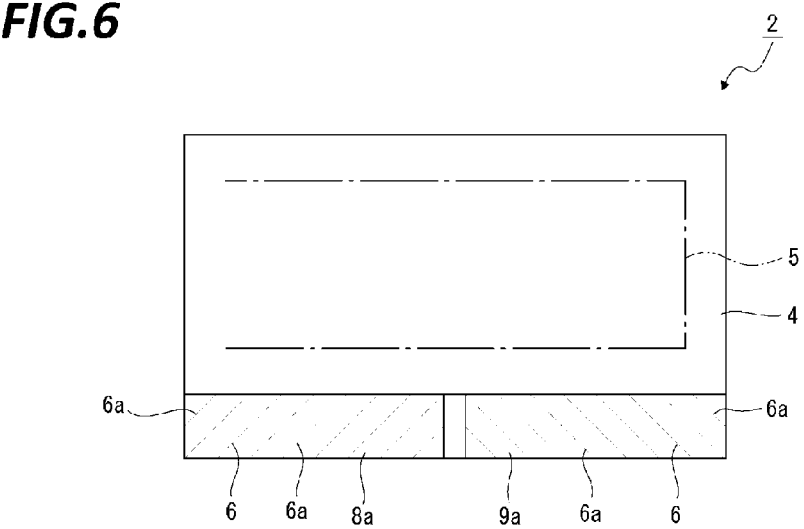
FIG. 6 is a front view of still another planar light emitting body.

The metal wires 6a, 6a, . . . are not limited to the parallel lines extending in the left-right direction, and, for example, may be mesh shape diagonal lines (see FIG. 5), and, although not illustrated, may have a mesh shape extending vertically and horizontally. Further, the metal wires 6a, 6a, . . . are not limited to the mesh shape, and, for example, may be parallel diagonal lines (see FIG. 6).

As described above, the extraction electrode 6 is constituted by a plurality of metal wires 6a, 6a, . . . , and the wire width of the wire 6a and the distance between the adjacent metal wires 6a and 6a are set as follows.

The wire width of the metal wire 6a is x, the interval between the adjacent metal wires 6a and 6a is y, the distance from a viewer to the extraction electrode 6 is L, and the transmittance required in the planar light emitting body 2 is T. When the distance L and the transmittance T are set to predetermined values, the wire width x and the interval y have values that satisfy Conditional Expression (1) and Conditional Expression (2).

$$x \leq L/4250 \qquad (1)$$

$$y \geq Tx/(100-T) \qquad (2)$$

Here, L, x, and y are in unit of mm, and T is in unit of %.

Figure 7:
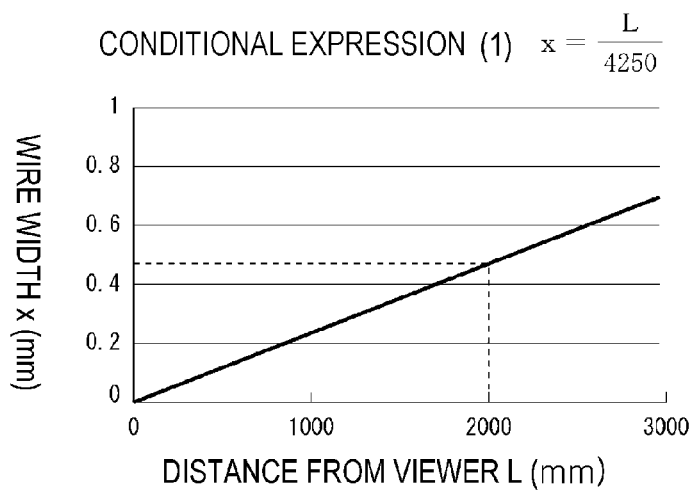
FIG. 7 is a graph illustrating Conditional Expression (1).
Figure 8:
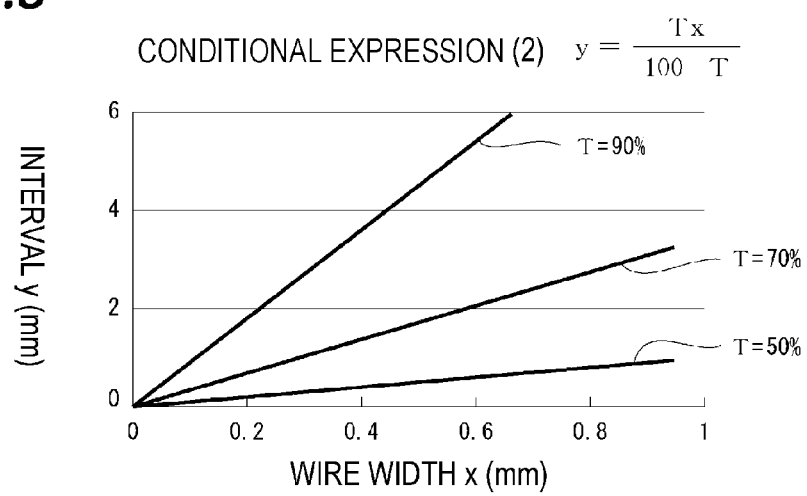
FIG. 8 is a graph illustrating Conditional Expression (2).

Conditional Expression (1) and Conditional Expression (2) are illustrated as graphs in FIG. 7 and FIG. 8, respectively. Conditional Expression (1) is a conditional Expression for setting the wire width x equal to or less than the resolution of human eyes in relation to the distance L. Conditional Expression (2) is a conditional Expression for calculating the interval y to secure the required transmittance T in relation to the calculated wire width x, and is an expression defined by considering that, when the wire width x is less than the resolution of the eyes of the viewer who visually recognizes the extraction electrode 6 from the distance L, the area ratio (aperture ratio) between the wire width x and the interval y is equal to the transmittance T.

Therefore, by setting the wire width x and the interval y that satisfy Conditional Expression (1) and Conditional Expression (2), the extraction electrode 6 is not recognized by the viewer when the viewer visually recognizes the extraction electrode 6, and the lower end portion of the planar light emitting body 2 including the extraction electrode 6 is recognized as being transparent.

Specifically, the wire width x and the interval y are calculated using Conditional Expression (1) and Conditional Expression (2) as follows. The calculation of the wire width x and the interval y is executed after setting the transmittance T and the distance L required for the planar light emitting body 2 are set to predetermined values.

The distance from the driver (viewer) of the following vehicle to the extraction electrode 6 of the planar light emitting body 2 disposed in the preceding vehicle is set to 2,000 mm. In general, 2,000 mm is a distance when the following vehicle comes closest to the preceding vehicle within a range where there is no safety problem. When the distance L is 2,000 mm, the wire width x is calculated to be 0.47 mm or less by Conditional Expression (1). At this time, when the transmittance T required in the planar light emitting body 2 is 90%, since the wire width x is 0.47 mm, the interval y is calculated to be 4.24 mm or more by Conditional Expression (2).

Further, generally, the transmittance of the rear window of the vehicle is set to 60% to 70%, and when the transmittance T is 70%, the interval y is calculated to be 1.1 mm or more by Conditional Expression (2).

By substituting x in Conditional Expression (1) into Conditional Expression (2), the following Conditional Expression (3), which is a relationship expression of the interval y, the distance L, and the transmittance T, is defined.

$$y \geq TL/4250(100-T) \qquad (3)$$

Therefore, when the distance L is set, the interval y for securing the required transmittance T may be obtained regardless of the wire width x.

Since the above specific values of the distance L and the transmittance T are examples, the wire width x and the interval y of the extraction electrode 6 may be determined by Conditional Expression (1) and Conditional Expression (2), by setting the distance L assumed when the vehicle 100 is used and the transmittance T required for the planar light emitting body 2 irrespectively of the above values.

As described above, in the vehicle lamp 1, since the wire width x of the metal wire 6a of the extraction electrode 6 is equal to or less than the resolution of the eyes of the viewer, the extraction electrode 6 is not recognized by the viewer, and the lower end portion of the planer light emitting body 2 including the extraction electrode 6 may be visually recognized as being transparent.

The flexible printed wiring boards 3 and 3 are connected to the extraction electrodes 6 and 6 of the planar light emitting body 2, respectively (see FIG. 2).

Figure 9:
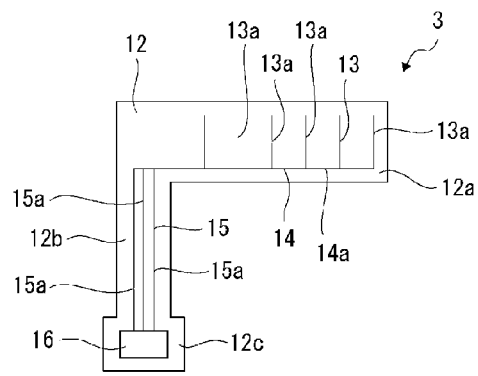
FIG. 9 is a front view of a flexible printed wiring board.

The flexible printed wiring board 3 includes a transparent wiring base 12, a connection electrode 13 formed on the wiring base 12, a relay connection portion 14 connected to the connection electrode 13, a conductive portion 15 connected to the connection electrode 13 via the relay connection portion 14, and a land portion 16 connected with the conductive portion 15 (see FIG. 9).

The wiring base 12 is constituted by a first portion 12a formed in a horizontally long rectangular, a second portion 12b protruding downward from a part of the first portion 12a, and a third portion 12c continuous with the lower end of the second portion 12b and having a lateral width larger than that of the second portion 12b.

The connection electrode 13 is formed in the first portion 12a of the wiring base 12, and, is constituted by, for example, a plurality of colored metal wires 13a, 13a, . . . arranged at a predetermined interval. The metal wires 13a, 13a, . . . are formed, for example, as parallel lines extending in the vertical direction. The intervals between the metal wires 13a, 13a, . . . are arbitrary, and may be evenly spaced or unequally spaced.

The relay connection portion 14 is formed in the lower end portion of the first portion 12a of the wiring base 12, and, is constituted by, for example, a plurality of colored metal wires 14a. The metal wire 14a, for example, extends in the left-right direction, and is connected to the metal wires 13a, 13a, . . . of the connection electrode 13.

The conductive portion 15 is formed inside the second portion 12b of the wiring base 12 excepting both the upper end portion and the lower end portion, and, is constituted by, for example, a plurality of colored metal wires 15a, 15a, . . . arranged at a predetermined interval. The metal wires 15a, 15a, . . . are connected to one end portion of the relay connection portion 14. The metal wires 15a, 15a, . . . are formed, for example, as parallel lines extending in the vertical direction. The intervals between the metal wires 15a, 15a, . . . are arbitrary, and may be evenly spaced or unequally spaced.

The land portion 16 is formed in the third portion 12c of the wiring base 12, and is connected to the lower ends of the metal wires 15a, 15a, . . . of the conductive portion 15. The land portion 16 is connected to a terminal portion of a control board (not illustrated), and the control board is connected to a power source (not illustrated) via, for example, a cable. Since the land portion 16 is a portion that is not visually recognized from the outside in a state where the vehicle lamp 1 is disposed on the inner surface side of the rear window 101, the land portion 16 may be colored.

In the flexible printed wiring boards 3 and 3, the connection electrodes 13 and 13 are connected to the extraction electrodes 6 and 6 of the planar light emitting body 2, respectively, for example, via Anisotropic Conductive Films (ACF) 17 and 17 (see FIG. 3).

Figure 10:
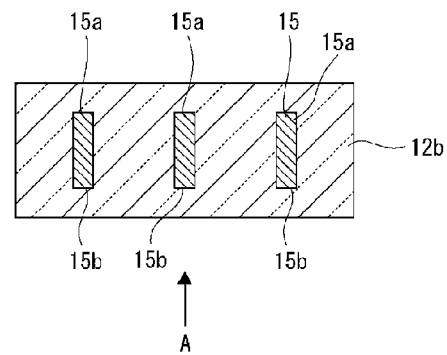
FIG. 10 is a cross-sectional view illustrating a conductive portion of the flexible printed wiring board.

In the flexible printed wiring board 3, the conductive portion 15 is formed inside the second portion 12b, and the metal wires 15a, 15a, . . . of the conductive portion 15 are formed in a shape having a longitudinal direction and a transverse direction in a cross-sectional shape orthogonal to the extending direction (see FIG. 10). The metal wires 15a, 15a, . . . are formed, for example, in a rectangular shape in a cross-sectional shape orthogonal to the extending direction, and are formed inside the second portion 12b in a state where the longitudinal direction of the cross-sectional shape is aligned with the thickness direction of the wiring base 12.

As described above, in the metal wires 15a, 15a, . . . of the conductive portion 15, since the longitudinal direction of the cross-sectional shape orthogonal to the extending direction is aligned with the thickness direction of the wiring base 12, when the vehicle lamp 1 is visually recognized from the rear that is the viewing direction A, the visually recognized portion of the conductive portion 15 in the flexible printed wiring board 3 is end surfaces 15b, 15b, . . . on one side of the longitudinal direction of the metal wires 15a, 15a, . . . , and the visible range of the conductive portion 15 in the flexible printed wiring board 3 is reduced.

As described above, in the flexible printed wiring board 3, since the conductive portion 15 is constituted by a plurality of metal wires 15a, 15a, . . . arranged at a predetermined interval and the visible range of the conductive portion 15 in the flexible printed wiring board 3 is reduced, the conductive portion 15 is less noticeable, and the flexible printed wiring board 3 is recognized as being transparent for the viewer, which may promote improvement in the invisibility of the vehicle lamp 1.

Further, also in the flexible printed wiring board 3, since both of the connection electrode 13 and the conductive portion 15 are constituted by a plurality of metal wires 13a, 13a, . . . and 15a, 15a, . . . , similarly to the case of the extraction electrode 6 of the planar light emitting body 2, it is possible to increase the transparency of the flexible printed wiring board 3 by calculating the wire width x and the interval y using Conditional Expression (1) and Conditional Expression (2) described above.

That is, by setting the wire width x of the metal wire 13a and the interval y between the metal wires 13a and 13a that satisfy Conditional Expression (1) and Conditional Expression (2), when the viewer visually recognizes the flexible printed wiring board 3, the portion of the flexible printed wiring board 3 in which the connection electrode 13 is formed is recognized as being transparent for the viewer. Further, by setting the wire width x of the metal wire 15a and the interval y between the metal wires 15a and 15a that satisfy Conditional Expression (1) and Conditional Expression (2), when the viewer visually recognizes the flexible printed wiring board 3, the portion of the flexible printed wiring board 3 in which the connection electrode 13 is formed is recognized as being transparent for the viewer.

In particular, in the conductive portion 15, as described above, since the longitudinal direction of the cross-sectional shape orthogonal to the extending direction of the metal wires 15a, 15a, . . . is aligned with the thickness direction of the wiring base 12, it is easy to increase the interval y between the metal wires 15a and 15a with respect to the wire width x of the metal wire 15a, and it is possible to increase the transparency without reducing the current density of the current flowing through the metal wires 15a, 15a, . . . .

Further, since it is easy to increase the interval y between the metal wires 15a and 15a, it is possible to decrease the lateral width of the flexible printed wiring board 3 to that extent, and thus, the flexible printed wiring board 3 may be downsized.

Additionally, in the vehicle lamp 1, in both of the extraction electrode 6 and the connection electrode 13, it is possible to increase the transparency of both of the extraction electrode 6 and the flexible printed wiring board 3 by calculating the wire width x and the interval y using Conditional Expression (1) and Conditional Expression (2). Further, in the extraction electrode 6, the connection electrode 13, and the conductive portion 15, it is possible to calculate the wire width x and the interval y using Conditional Expression (1) and Conditional Expression (2), and to increase the transparency of both of the extraction electrode 6 and the flexible printed wiring board 3.

In the flexible printed wiring board 3, the metal wire 15a may be divided into a plurality of portions 15x, 15x, . . . in the longitudinal direction of the above cross-sectional shape. The number of the divided portions 15x of the metal wire 15a is arbitrary.

As described above, in the case where the metal wire 15a is divided into the portions 15x, 15x, . . . , since the portions 15x, 15x, . . . of the metal wire 15a are disposed side by side in the thickness direction of the wiring base 12 and the direction orthogonal to the thickness direction, it is possible to make the conductive portion 15 to be visually recognized as being transparent without reducing the current density of the current flowing through the metal wires 15a, 15a, . . . , and then, to promote improvement in the degree of freedom in designing the flexible printed wiring board 3.

Figure 11:
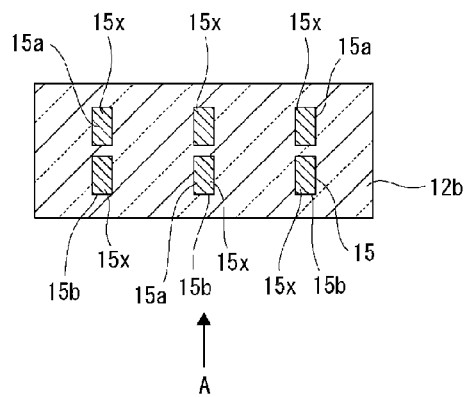
FIG. 11 is a cross-sectional view illustrating another conductive portion of the flexible printed wiring board.

The configuration in which the longitudinal direction of the above cross-sectional shape of the metal wire 15a is aligned with the thickness direction of the wiring base 12 (see FIGS. 10 and 11) may be applied to the metal wire 13a of the connection electrode 13 and the metal wire 14a of the relay connection portion 14 with respect to the wiring base 12 of the flexible printed wiring board 3, and may be also applied to the metal wire 6a of the extraction electrode 6 of the planar light emitting body 2.

Figure 12:
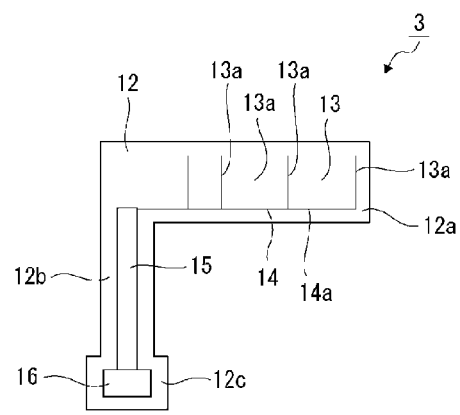
FIG. 12 is a front view of another flexible printed wiring board.
Figure 13:
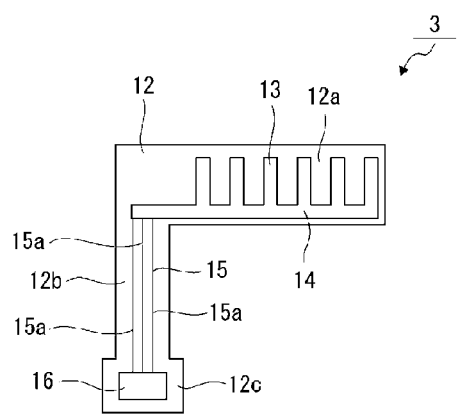
FIG. 13 is a front view of still another flexible printed wiring board.

In the above, the example of the flexible printed wiring board in which all of the connection electrode 13, the relay connection portion 14, and the conductive portion 15 are constituted by the metal wires 13a, 14a, and 15a is illustrated, but in the flexible printed wiring board 3, the connection electrode 13 and the relay connection portion 14 may be constituted by the metal wires 13a and 14a, and the conductive portion 15 may be constituted by, for example, a transparent electrode such as ITO (see FIG. 12). Further, in the flexible printed wiring board 3, the connection electrode 13 and the relay connection portion 14 may be constituted by, for example, a transparent electrode such as ITO, and the conductive portion 15 may be constituted by the metal wire 15a (see FIG. 13). Additionally, although not illustrated, the connection electrode 13 may be constituted by the metal wire 13a, and the relay connection portion 14 and the conductive portion 15 may be constituted by, for example, a transparent electrode such as ITO, and the connection electrode 13 may be constituted by, for example, a transparent electrode such as ITO, and the relay connection portion 14 and the conductive portion 15 may be constituted by the metal wires 14a and 15a.

Figure 14:
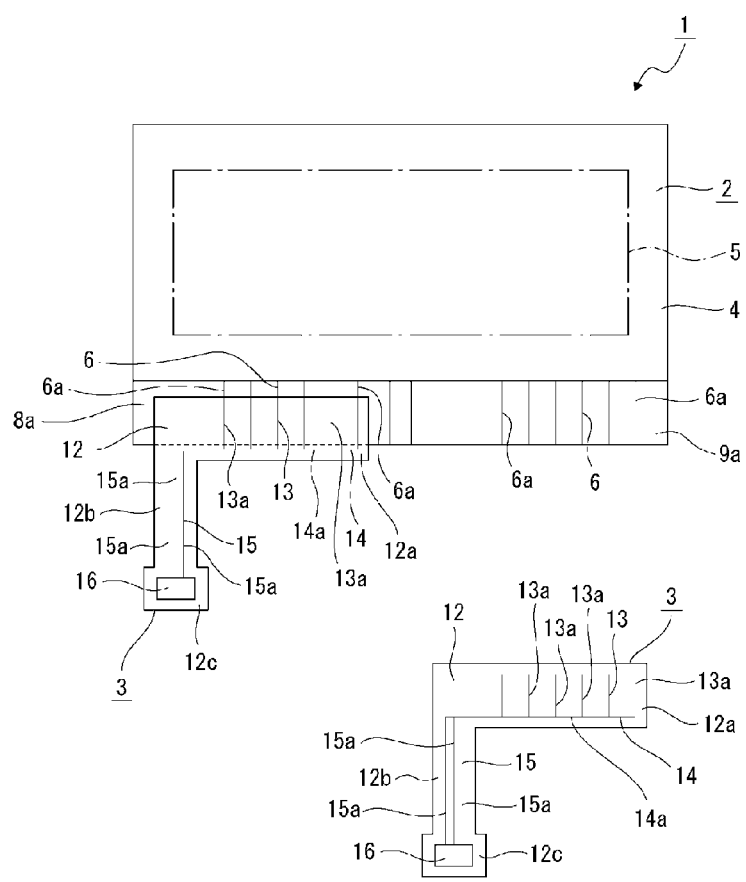
FIG. 14 is a front view of still another flexible printed wiring board and flexible printed wiring board.

Further, in the above, the example in which the metal wires 6a, 6a, . . . of the extraction electrode 6 of the planar light emitting body 2 extend in the left-right direction or in the oblique direction with respect to the left-right direction, and the metal wires 13a, 13a, . . . of the flexible printed wiring board 3 extend in the vertical direction is illustrated, but the metal wires 6a, 6a, . . . and the metal wires 13a, 13a, . . . may be formed as parallel lines extending together in the same direction (see FIG. 14). For example, the metal wires 6a, 6a, . . . and the metal wires 13a, 13a, . . . may be formed as parallel lines extending together in the vertical direction, and the metal wires 6a, 6a, . . . and the metal wires 13a, 13a, . . . may be configured such that both of them are connected by being positioned to overlap each other. The metal wires 6a, 6a, . . . and the metal wires 13a, 13a, . . . may be formed as parallel liens extending in the same direction other than the vertical direction.

As described above, in the vehicle lamp 1, the extraction electrode 6 and the connection electrode 13 are constituted by a plurality of metal wires 6a, 6a, . . . , and a plurality of metal wires 13a, 13a, . . . arranged at a predetermined interval, respectively.

Therefore, since the extraction electrode 6 and the connection electrode 13 are constituted by the plurality of metal wires 6a, 6a, . . . and 13a, 13a, . . . arranged at a predetermined interval, respectively, the extraction electrode 6 and the connection electrode 13 are less noticeable, and the planar light emitting body 2 and the flexible printed wiring boards 3 and 3 are recognized as being transparent, which may promote improvement in the invisibility of the vehicle lamp 1.

[Configuration related to Transmittance of Vehicle Lamp and Transparent Body]

Figure 15:
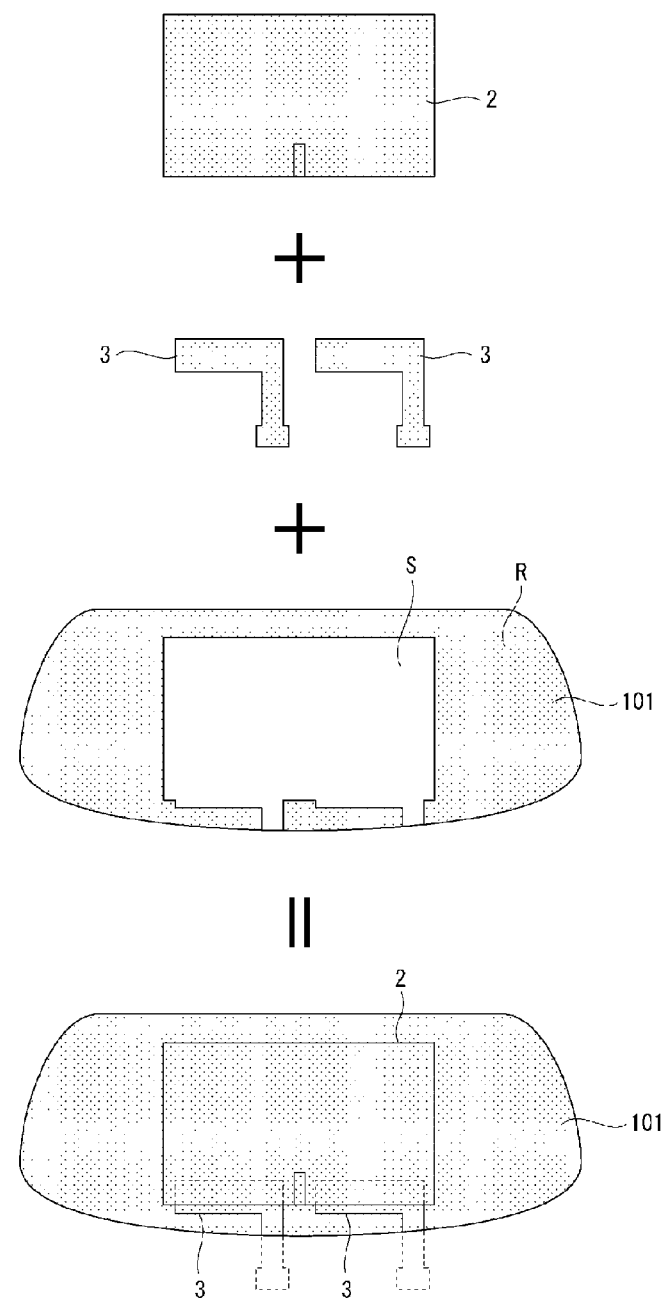
FIG. 15 is a schematic view illustrating a configuration relating to a transmittance of a vehicle lamp and a rear window.

Next, the configuration related to the transmittance between the vehicle lamp 1 and a transparent body such as the rear window 101 (see FIG. 15).

The vehicle lamp 1 is disposed, for example, on the inner surface side of the rear window 101 provided as the transparent body. As described above, the vehicle lamp 1 includes the planar light emitting body 2 and the flexible printed wiring boards 3 and 3. The planar light emitting body 2 and the flexible printed wiring boards 3 and 3 have a total transmittance of a predetermined value, for example, 60%.

The transmittance of a region R of the rear window 101 (region to which a pear-skin texture is attached in FIG. 15) is set to a predetermined value, for example, 60%. A region S other than the region R (region to which the pear-skin texture is not attached in FIG. 15) is a region in which the vehicle lamp 1 is disposed, that is, a region in which the planar light emitting body 2 and the flexible printed wiring boards 3 and 3 excepting the lower end portion thereof are disposed, and has a transmittance of, for example, 100%.

By setting the rear window 101 that is a transparent body and the planar light emitting body 2 and the flexible printed wiring boards 3 and 3 disposed on the rear window 101 to have the transmittances described above, when the rear window 101 is visually recognized by the viewer, the entire rear window is recognized as having the same transmittance, and the planar light emitting body 2 and the flexible printed wiring boards 3 and 3 are not noticeable with respect to the rear window 101.

Therefore, the rear window 101 and the vehicle lamp 1 are recognized as being integrated for the viewer, and the improvement in the invisibility of the vehicle lamp 1 may be promoted.

The transmittance of the region S of the rear window 101 is not necessarily 100%, and in the state where the vehicle lamp 1 is disposed in the region S, the total transmittance of the region S and the vehicle lamp 1 may be set to be equal to the transmittance of the region R of the rear window 101. For example, the transmittance of the planar light emitting body 2 and the flexible printed wiring boards 3 and 3 may be set to 60%, and the transmittance of the region S may be set to 90%, and the transmittance of the region as a whole may be set to 54%, and the transmittance of the region R may be set to 54%.

[Configuration of Vehicle Lamp Reducing Light Emission Unevenness]

Figure 16:
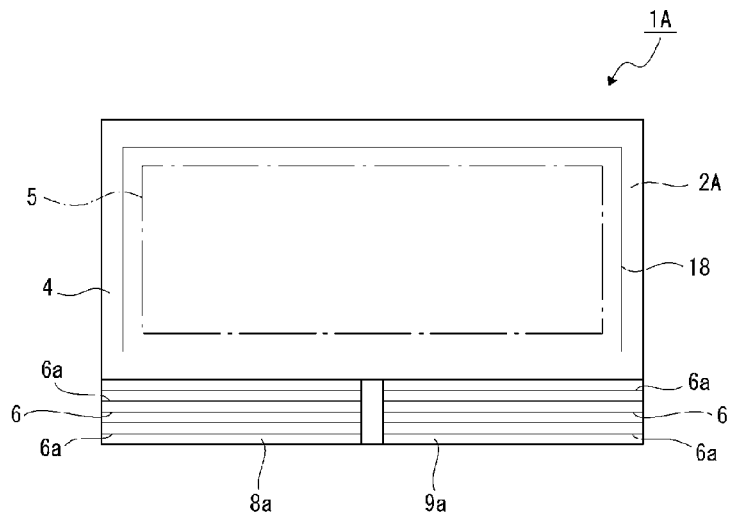
FIG. 16 is a front view of a planar light emitting body having a circulating electrode.

Next, a configuration of a vehicle lamp 1A that reduces light emission unevenness will be described (see FIGS. 16 to 17). Since the vehicle lamp 1A illustrated below is different in that a circulating electrode is formed around the light emitting portion as compared to the vehicle lamp 1 described above, only parts different from the vehicle lamp 1 will be described in detail, and other parts will be denoted by the same reference numerals as the same parts in the vehicle lamp 1, and descriptions thereof will be omitted.

In the vehicle lamp 1A, circulating electrodes 18 and 18 are connected to the anode 8 and the cathode 9, respectively, in a planar light emitting body 2A. The circulating electrodes 18 and 18 have an outer shape much larger than that of the light emitting portion 5, and are positioned around the light emitting portion 5. Electric power is supplied to the light emitting portion 5 from the circulating electrodes 18 and 18. For example, a metal wiring such as a stacked structure of molybdenum-aluminum-molybdenum (MAM) is used as the circulating electrode 18.

Generally, in an organic EL panel, since the extraction electrode is formed in one end portion of the base body, and the anode or the cathode made of, for example, ITO has high resistance, the larger the distance from the extraction electrode, the larger the voltage drop, and the difference in luminance between the portion of the light emitting portion close to the extraction electrode and the portion of the light emitting portion far from the extraction electrode is large, and thus, light emission unevenness is likely to occur.

Therefore, as described above, by setting such that electric power is supplied to the light emitting portion 5 from the circulating electrodes 18 and 18, the luminance in each portion of the light emitting portion 5 does not depend on the position of the extraction electrodes 6 and 6 with respect to the light emitting portion 5, but depends on the distance from the circulating electrodes 18 and 18.

Therefore, as described above, by having the configuration in which the circulating electrodes 18 and 18 are provided around the light emitting portion 5, a large difference does not occur in the distance from the circulating electrodes 18 and 18 in each portion of the light emitting portion 5, and the difference in luminance in each portion of the light emitting portion 5 is reduced, and thus, the occurrence of the light emission unevenness in the vehicle lamp 1A may be suppressed.

Figure 17:
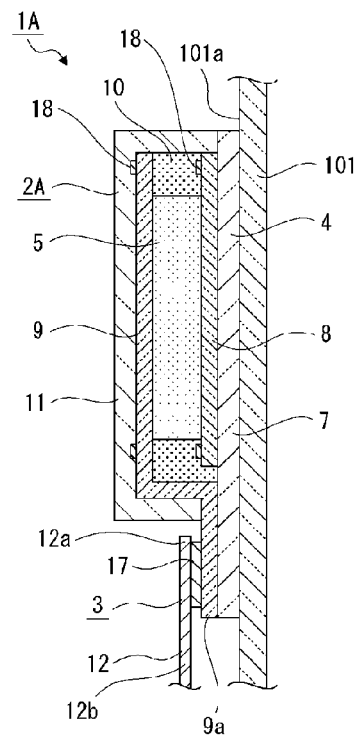
FIG. 17 is a cross-sectional view of a vehicle lamp having a circulating electrode.

Further, in the vehicle lamp 1A, the circulating electrodes 18 and 18 and the extraction electrodes 6 and 6 are connected by metal wires 19, 19, . . . , respectively, and the electric power may be supplied from the extraction electrodes 6 and 6 to the light emitting portion 5 via the metal wires 19, 19, . . . and the circulating electrodes 18 and 18 (see FIG. 17). The metal wires 19, 19, . . . are parallel lines extending vertically.

Figure 18:
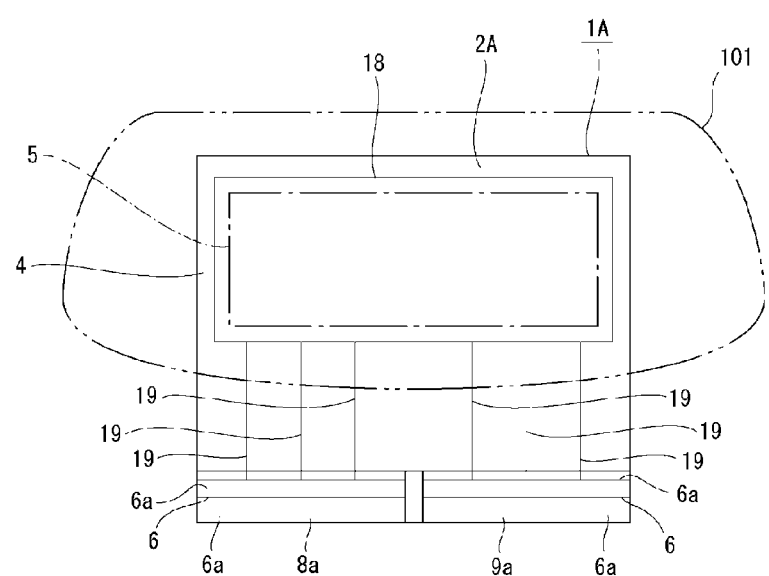
FIG. 18 is a concept view illustrating a planar light emitting body in which a circulating electrode is formed and the circulating electrode is connected to an extraction electrode by a metal wire, together with a rear window.

In this case, it is possible to lengthen the length of the metal wires 19, 19, . . . so that the portion of the planar light emitting body 2A including the extraction electrodes 6 and 6 is positioned outside (lower side) of the rear window 101 (see FIG. 18).

As described above, by positioning the portion of the planar light emitting body 2A including the extraction electrodes 6 and 6 outside the rear window 101, it is possible to shield the portion including the extraction electrodes 6 and 6 and the flexible printed wiring boards 3 and 3 connected to the extraction electrodes 6 and 6, respectively, by the vehicle body of the vehicle 100, and it is possible to further improve the invisibility of the vehicle lamp 1A.

[Arrangement of Vehicle Lamp]

In the following, an arrangement aspect of the vehicle lamps 1 and 1A with respect to the transparent body will be described (see FIGS. 19 to 23). In FIGS. 19 to 23, planar light emitting bodies and flexible printed wiring boards having different shapes are illustrated, but the planar light emitting bodies and the flexible printed wiring boards having different shapes are different from each other only in shape, and have the same configuration with the planar light emitting body 2 and the flexible printed wiring board 3 described above.

Figure 19:
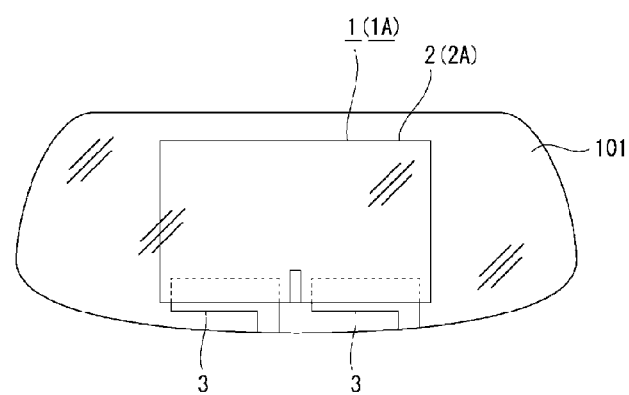
FIG. 19 is a rear view illustrating an example in which a vehicle lamp is disposed corresponding to a central portion of a rear window.

The vehicle lamp 1 or the vehicle lamp 1A is disposed, for example, corresponding to the central portion of the rear window 101, which is a transparent body (see FIG. 19). By disposing the vehicle lamp 1 or the vehicle lamp 1A corresponding to the central portion of the rear window 101, when the light emitting portion 5 emits light (when turning on), the turned-on state is noticeable to passengers of the following vehicle or pedestrians, and it is possible for the vehicle lamp 1 or the vehicle lamp 1A to exert a good function as a marker lamp.

Figure 20:
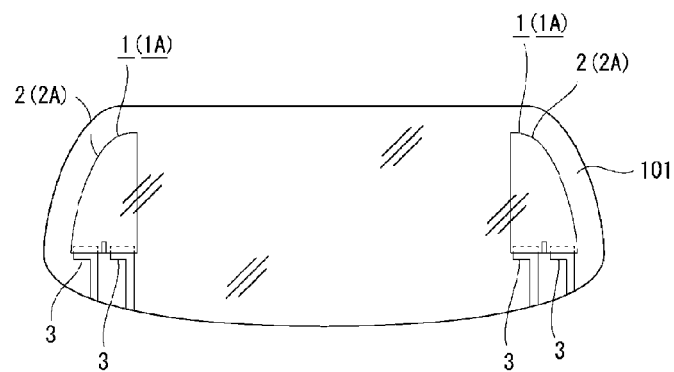
FIG. 20 is a rear view illustrating an example in which vehicle lamps are disposed corresponding to both left and right ends of a rear window, respectively.

Further, the vehicle lamps 1 and 1 or the vehicle lamps 1A and 1A are disposed, for example, corresponding to both the left end portion and the right end portion of the rear window 101, which is a transparent body (see FIG. 20). By disposing the vehicle lamps 1 and 1 or the vehicle lamps 1A and 1A corresponding to both the left end portion and the right end portion of the rear window 101, when turning on, the turned-on state is noticeable to passengers of the following vehicle or pedestrians, and a good rear view is secured for the passengers of the vehicle 100 at the time of both turning on and turning off, and it is possible for the vehicle lamps 1 and 1 or the vehicle lamps 1A and 1A to exert a good function as a marker lamp after securing a good outside view.

Figure 21:
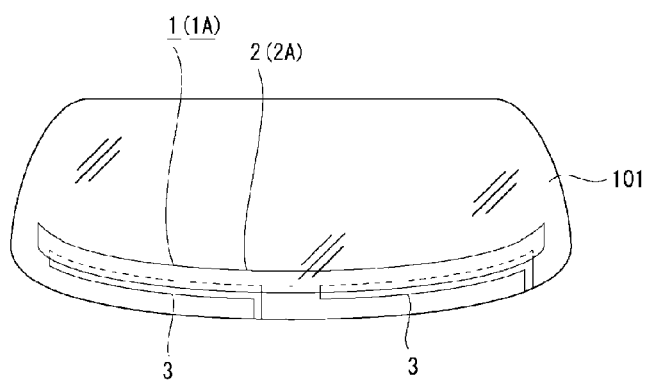
FIG. 21 is a rear view illustrating an example in which a vehicle lamp is disposed corresponding to a lower end portion of a rear window.

Additionally, the vehicle lamp 1 or the vehicle lamp 1A is disposed, for example, corresponding to the lower end portion of the rear window 101, which is a transparent body (see FIG. 21). By disposing the vehicle lamp 1 or the vehicle lamp 1A corresponding to the lower end portion of the rear window 101, when turning on, the turned-on state is noticeable to passengers of the following vehicle or pedestrians, and a good rear view is secured for the passengers of the vehicle 100 at the time of both turning on and turning off, and it is possible for the vehicle lamp 1 or the vehicle lamp 1A to exert a good function as a marker lamp after securing a good outside view.

Figure 22:
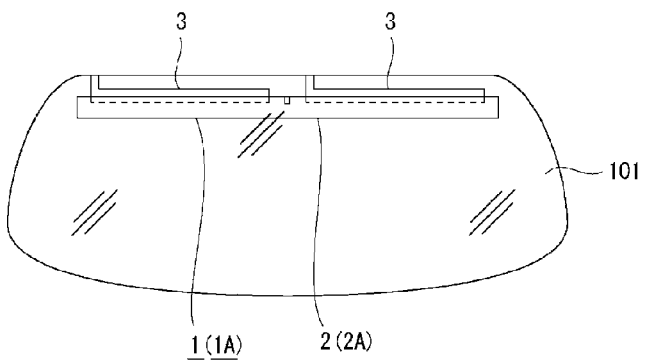
FIG. 22 is a rear view illustrating an example in which a vehicle lamp is disposed corresponding to an upper end portion of a rear window.

Furthermore, the vehicle lamp 1 or the vehicle lamp 1A is disposed, for example, corresponding to the upper end portion of the rear window 101, which is a transparent body (see FIG. 22). By disposing the vehicle lamp 1 or the vehicle lamp 1A corresponding to the upper end portion of the rear window 101, when turning on, the turned-on state is noticeable to passengers of the following vehicle or pedestrians, and a good rear view is secured for the passengers of the vehicle 100 at the time of both turning on and turning off, and it is possible for the vehicle lamp 1 or the vehicle lamp 1A to exert a good function as a marker lamp after securing a good outside view.

Figure 23:
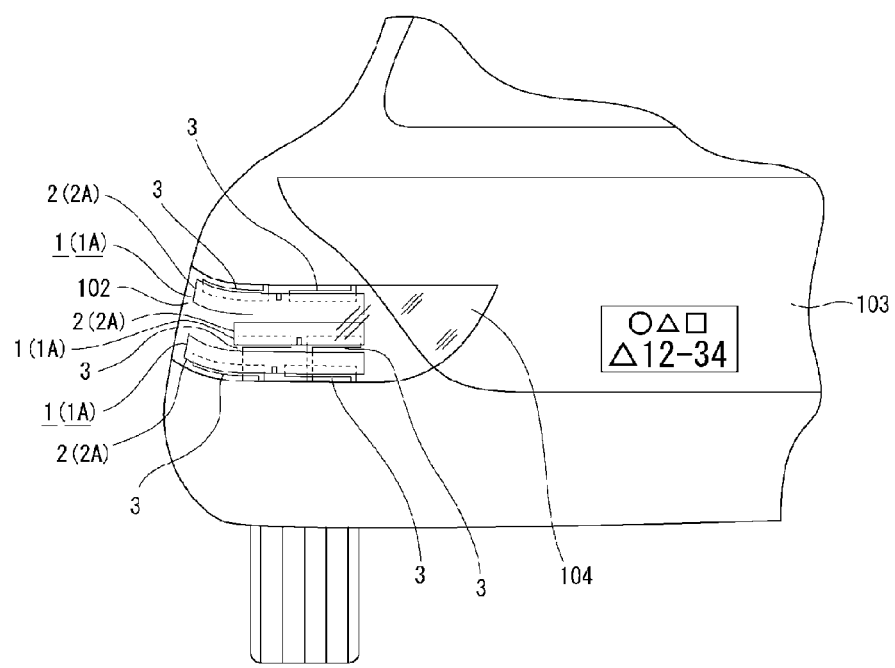
FIG. 23 is a rear view illustrating an example in which a vehicle lamp is disposed on an inner surface side of a cover.

Further, the vehicle lamp 1 or the vehicle lamp 1A is disposed, for example, on the inner surface side of a cover 102, which is a transparent body (see FIG. 23). The cover 102 may be mounted to any of the front end portion or the rear end portion of the vehicle 100. The vehicle lamps 1 and 1A may be disposed, for example, in the fixed portion of the vehicle body as illustrated in FIG. 23, and may also be disposed on the inner surface side of a cover 104 mounted to a trunk lid 103, which is a movable part of the vehicle body.

By disposing the vehicle lamp 1 or the vehicle lamp 1A on the inner surface side of the cover 102 or the cover 104, it is possible for the vehicle lamp 1 or the vehicle lamp 1A to exert a good function as a marker lamp or a headlamp. Further, as illustrated in FIG. 23, by disposing a plurality of vehicle lamps 1, 1, . . . or a plurality of vehicle lamps 1A, 1A, . . . on the inner surface side of the cover 102 or the cover 104, it is possible to configure the respective vehicle lamps 1, 1, . . . or the respective vehicle lamps 1A, 1A, . . . to have different functions, and to promote improvement in the degree of freedom in designing and improvement in functionality.

[Vehicle Lamp Having Light-Shielding Property]

Subsequently, a vehicle lamp 1B having a light-shielding property will be described (see FIGS. 24 to 26).

The vehicle lamp 1B is a so-called single-sided light emitting type vehicle lamp including a planar light emitting body 2B, and emitting light from one surface of the planar light emitting body 2B. The vehicle lamp 1B is used as a marker lamp such as a tail lamp or a stop lamp.

Figure 24:
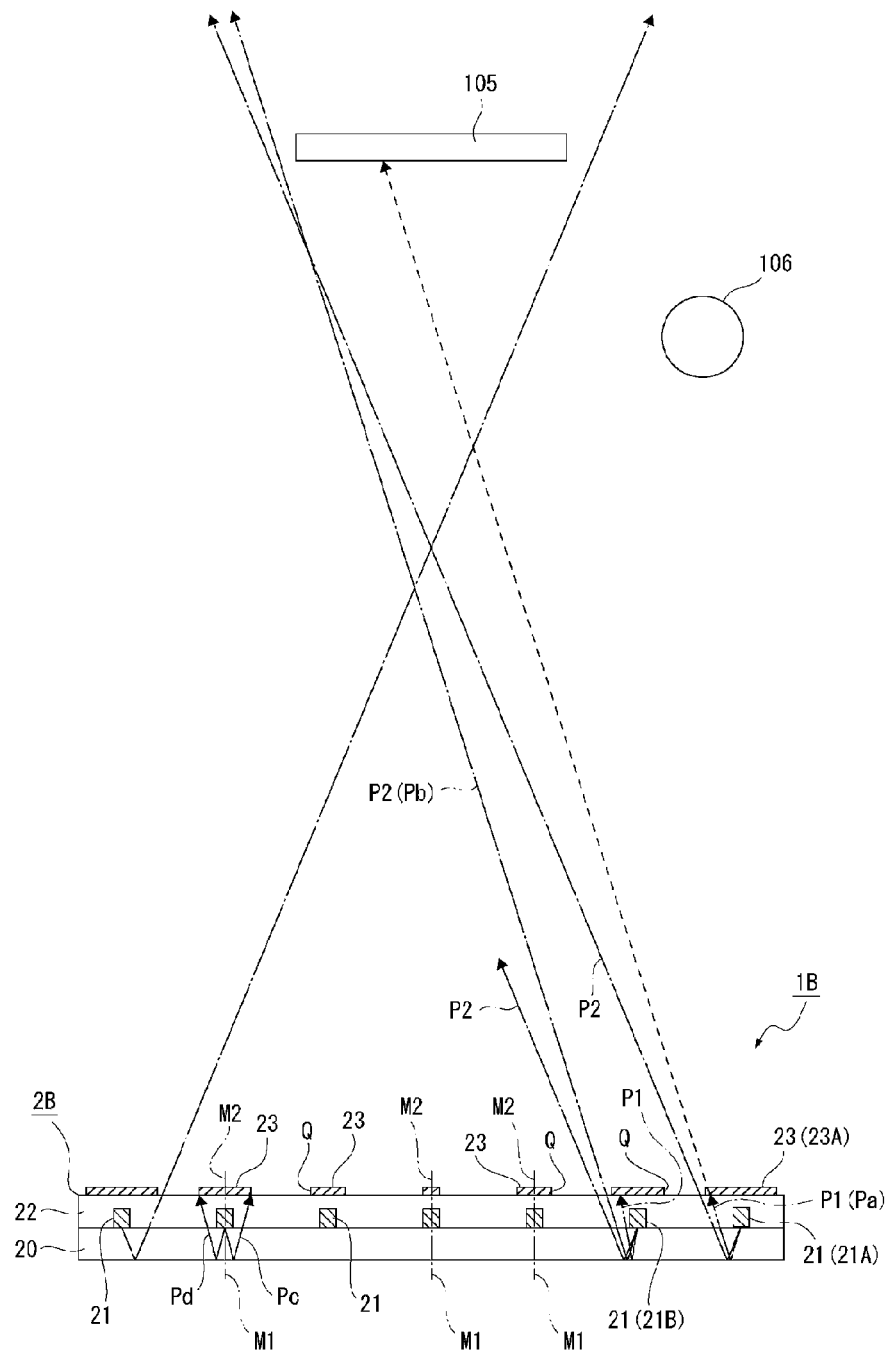
FIG. 24 is a cross-sectional view of a vehicle lamp having a light-shielding property.

The planar light emitting body 2B includes a transparent substrate 20, light emitting units 21, 21, . . . , and a sealing member 22 (see FIG. 24). The vehicle lamp 1B is disposed, for example, on the inner surface side of the rear window 101 of the vehicle 100. The vehicle lamp 1B may be attached to the inner surface of the rear window 101, or may be disposed in a state of having a constant interval from the inner surface of the rear window 101. The Vehicle lamp 1B is positioned corresponding to the central portion of the rear window 101.

The light emitting units 21, 21, . . . are disposed on the front surface of the transparent substrate 20 to be separated at equal intervals in the left-right direction in a state of being sealed by the sealing member 22.

Light-shielding films 23, 23, . . . are attached to the front surface of the sealing member 22 to be separated in the left-right direction. The light-shielding film 23 may be an opaque cathode.

The light-shielding films 23, 23, . . . are positioned in front of the light emitting units 21, 21, . . . , respectively. A center line M1 of the light emitting unit 21 in the left-right direction and a center line M2 of the light-shielding film 23 in the left-right direction coincide with each other. The lateral width of the light-shielding films 23, 23, . . . is the smallest in the central portion of the planar light emitting body 2B in the left-right direction, and is increased as the light-shielding film 23 is separated from the central portion of the planar light emitting body 2B in the left-right direction to the left and the right. Therefore, the lateral widths of the light-shielding films 23 and 23 positioned on the leftmost side and the rightmost side are the largest.

In the vehicle lamp 1B, light is emitted rearward from the light emitting units 21, 21, . . . at the same maximum emission angle. The light emitted rearward from the light emitting unit 21 is transmitted through the rear window 101 from the rear surface of the transparent substrate 20 and is irradiated rearward, but a part of the light is internally reflected by the rear surface of the transparent substrate 20 and is directed forward in the passenger compartment. At this time, when the light internally reflected and directed forward is incident on a rear-view mirror (room mirror) 105, when a driver 106 checks the situation of the rear side by the rear-view mirror 105, the light internally reflected by the transparent substrate 20 is reflected by the rear-view mirror 105 and is in the field of view of the driver 106, which makes it difficult to check the situation of the rear side.

In particular, since the vehicle lamp 1B is used as a marker lamp such as a tail lamp, the light emitted from the light emitting units 21, 21, . . . is red light, and when the red light is in the field of view, the driver 106 may misunderstand that the light is emitted from another vehicle.

However, the light-shielding films 23, 23, . . . are provided in the vehicle lamp 1B, and the light P1, P1, . . . obtained by removing a part of the light emitted from the light emitting unit 21, internally reflected, and directed forward is shield by the light-shielding films 23, 23, . . . , and the light internally reflected and directed forward is not incident on the rear-view mirror 105. Therefore, the light internally reflected by the transparent substrate 20 does not come into the field of view of the driver 106, and the situation of the rear side may be checked without any inconvenience and the misunderstanding does not occur.

Further, in the vehicle lamp 1B, gaps Q, Q, . . . are formed between the light-shielding films 23, 23, . . . , and thus, the driver 106 may check the situation of the rear side by visually recognizing the rear side through the gaps Q, Q, . . . by the rear-view mirror 105.

Meanwhile, the light P2, P2, . . . of the light internally reflected by the rear surface of the transparent substrate 20, which is not shielded by the light-shielding films 23, 23, . . . , passes through the gaps Q, Q, . . . formed between the light-shielding films 23, 23, . . . and is directed to the front side of the passenger compartment.

As described above, the vehicle lamp 1B is positioned corresponding to the central portion of the rear window 101, and the central portion of the planar light emitting body 2B in the left-right direction coincides with the central portion of the vehicle in the left-right direction. Therefore, in the positional relationship between the rear-view mirror 105 and the light emitting units 21, 21, . . . , the light is more likely to be incident on the rear-view mirror 105 even at a large emission angle when the light emitting unit 21 is positioned closer to both ends in the left-right direction.

For example, as illustrated in FIG. 24, the light Pa emitted from the light emitting unit 21A positioned outermost side in the left-right direction and internally reflected and the light Pb emitted from the light emitting unit 21B positioned inside the light emitting unit 21A and internally reflected have the same emission angle. However, since the light emitting unit 21A is positioned farther from the rear-view mirror 105 then the light emitting unit 21B in the left-right direction, the light Pa becomes light directed to the rear-view mirror 105, and the light Pb becomes light directed to a position shifted from the rear-view mirror 105.

Therefore, in the vehicle lamp 1B, the lateral widths of the light-shielding films 23, 23, . . . are determined by considering that the incident state on the rear-view mirror 105 is changed by the emission angle of the light from the light emitting units 21, 21, . . . by the positional relationship between the rear-view mirror 105 and the light emitting units 21, 21, . . . .

That is, since the light is more likely to be incident on the rear-view mirror 105 even at a large emission angle when the light emitting unit 21 is positioned closer to both ends in the left-right direction, the lateral widths of the light-shielding films 23, 23, . . . are increased as the light-shielding film 23 is separated from the central portion of the planar light emitting body 2B in the left-right direction to the left and the right.

Meanwhile, since the light-shielding film 23A is capable of preventing the light of the light directed to the rear-view mirror 105, which is emitted from the light emitting unit 21 at a largest emission angle, from being incident on the rear-view mirror 105, it is possible to prevent the light emitted from the light emitting units 21, 21, . . . and internally reflected by the transparent substrate 20 from being incident on the rear-view mirror 105 by disposing the light-shielding films 23A, 23A, . . . in front of the light emitting units 21, 21, . . . , respectively.

However, when the light-shielding films 23A, 23A, . . . are disposed in front of the light emitting units 21, 21, . . . , respectively, since the light-shielding film 23A has the widest lateral width among the light-shielding films 23, 23, . . . , the gaps Q, Q, . . . become small, and thus, the visible range of the rear side for the driver 106 becomes small.

Therefore, as in the vehicle lamp 1B, by increasing the lateral width of the light-shielding films 23, 23, . . . as the light-shielding film 23 is separated from the central portion of the planar light emitting body 2B in the left-right direction to the left and the right, the total of the gaps Q, Q, . . . increases as compared to the configuration in which the light-shielding films 23A, 23A, . . . having the larger width are disposed, and thus, it is possible to secure the large visible range of the rear side for the driver 106, and then, to prevent the light emitted from the light emitting units 21, 21, . . . and internally reflected by the transparent substrate 20 from being incident on the rear-view mirror 105.

Further, the light emitted from the light emitting unit 21 and internally reflected by the transparent substrate 20 passes through the gaps Q and Q on both sides of the light emitting unit 21 and is directed forward, but the light directed to the rear-view mirror 105 is the light that passes through one gap Q. For example, as illustrated in FIG. 24, the light Pc emitted from the light emitting unit 21 and directed toward the central side of the planar light emitting body 2B in the left-right direction is the light directed toward the rear-view mirror 105, but the light Pd emitted from the same light emitting unit 21 and directed outside of the planar light emitting body 2B in the left-right direction is the light that is not directed toward the rear-view mirror 105.

Figure 25:
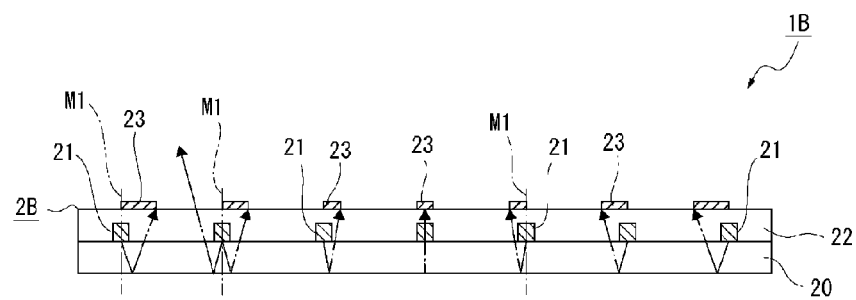
FIG. 25 is a cross-sectional view of another vehicle lamp having a light-shielding property.

Therefore, in order to shield the light of the vehicle lamp 1B, which is on the side toward the rear-view mirror 105, it is possible to dispose the light-shielding films 23, 23, . . . on one side with reference to the center lines M1, M1, . . . of the light emitting units 21, 21, . . . in the left-right direction, except for the light emitting unit 21 positioned in the central portion in the left-right direction (see FIG. 25).

By disposing the light-shielding films 23, 23, . . . , the lateral width of the light-shielding films 23, 23, . . . is further reduced and the total of the gaps Q, Q, . . . is further increased, and thus, it is possible to secure a larger visible range of the rear side for the driver 106, and then, to prevent the light emitted from the light emitting units 21, 21, . . . and internally reflected by the transparent substrate 20 from being incident on the rear-view mirror 105.

Figure 26:
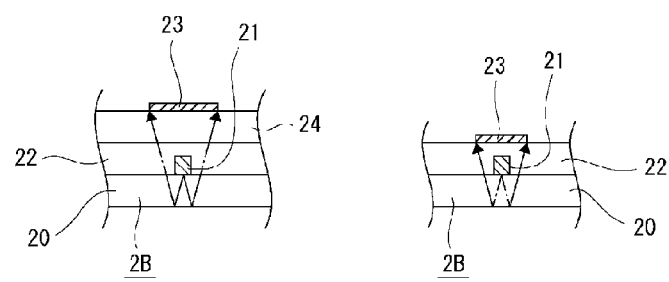
FIG. 26 is a cross-sectional view illustrating respective example in which a light-shielding film is attached by a different method in a vehicle having a light-shielding property.

Further, in the vehicle lamp 1B, the light-shielding film 23 may be attached to the sealing member 22 by an adhesive tape 24 (see the drawing on the left side in FIG. 26). It is possible to attach the light-shielding film 23 to the sealing member 22 at a low cost by attaching the light-shielding film 23 to the sealing member 22 by the adhesive tape 24.

However, when the light-shielding film 23 is attached to the sealing member 22 by the adhesive tape 24, high attachment accuracy of the light-shielding film 23 to the sealing member 22 is required, and the positional accuracy of the light-shielding film 23 to the sealing member 22 may be decreased.

Therefore, the light-shielding film 23 may be formed on the sealing member 22 by printing (see the drawing on the right side in FIG. 26). By forming the light-shielding film 23 on the sealing member 22 by printing, high positional accuracy of the light-shielding film 23 to the sealing member 22 is secured, and it is possible to more reliably prevent the light emitted from the light emitting unit 21 and internally reflected by the transparent substrate 20 from being incident on the rear-view mirror 105.

Further, when the light-shielding film 23 is attached to the sealing member 22 by the adhesive tape 24, the thickness of the planar light emitting body 2B becomes thick due to the presence of the adhesive tape 24, and the spread direction of the light in the planar light emitting body 2B increases, and thus, it is necessary to increase the lateral width of the light-shielding film 23. Meanwhile, when the light-shielding film 23 is formed on the sealing member 22 by printing, the thickness of the planar light emitting body 2B becomes thin due to the absence of the adhesive tape, and the spread direction of the light in the planar light emitting body 2B decreases, and thus, it is possible to decrease the lateral width of the light-shielding film 23.

Therefore, when the light-shielding film 23 is formed on the sealing member 22 by printing, the total of the gaps Q, Q, . . . is increased, and thus, it is possible to secure a larger visible range of the rear side for the driver 106, and then, to prevent the light emitted from the light emitting unit 21 and internally reflected by the transparent substrate 20 from being incident on the rear-view mirror 105.

DESCRIPTION OF SYMBOLS

1: vehicle lamp
2: planar light emitting body
3: flexible printed wiring board
4: base body
5: light emitting portion
6: extraction electrode
6a: metal wire
12: wiring base
13: connection electrode
13a: metal wire
15: conductive portion
15a: metal wire
21: light emitting unit 1A: vehicle lamp
2A: planar light emitting body
1B: vehicle lamp
2B: planar light emitting body

What is claimed is:

1. A vehicle lamp comprising:
a planar light emitting body including a transparent base body, a light emitting portion disposed inside the base body, and an extraction electrode formed on the base body and configured to supply a current to the light emitting portion; and
a flexible printed wiring board including a transparent wiring base, a connection electrode formed on the wiring base and connected to the extraction electrode, and a conductive portion connected to the connection electrode,
wherein the extraction electrode and the connection electrode are constituted by a plurality of metal wires respectively arranged at a predetermined interval, and
wherein, in at least one of the extraction electrode or the connection electrode, a wire width x of the metal wire and an interval y between the metal wires have values that satisfy following Conditional Expression (1) and Conditional Expression (2):

$$x \leq L/4250 \quad (1)$$

$$y \geq Tx/(100-T), \quad (2)$$

wherein L is a distance from a viewer to the extraction electrode or the connection electrode, T is a transmittance required in the planar light emitting body or the flexible printed wiring board, and wherein L, x, and y are in unit of mm, and T is in unit of %.

2. The vehicle lamp according to claim 1, wherein, in both of the extraction electrode and the connection electrode, the wire width x of the metal wire and the interval y between the metal wires have values that satisfy Conditional Expression (1) and Conditional Expression (2).

3. A vehicle lamp comprising:
a planar light emitting body including a transparent base body, a light emitting portion disposed inside the base body, and an extraction electrode formed on the base body and configured to supply a current to the light emitting portion; and
a flexible printed wiring board including a transparent wiring base, a connection electrode formed on the wiring base and connected to the extraction electrode, and a conductive portion connected to the connection electrode,
wherein the conductive portion is provided inside the wiring base and is constituted by a plurality of metal wires arranged at a predetermined interval in a direction orthogonal to a thickness direction of the wiring base,
the metal wire is formed in a shape having a longitudinal direction and a transverse direction in a cross-sectional shape orthogonal to an extending direction, and
the longitudinal direction of the metal wire is aligned with the thickness direction of the wiring base.

4. The vehicle lamp according to claim 3, wherein the metal wire is divided into a plurality of portions in the longitudinal direction.

5. The vehicle lamp according to claim 3, wherein, in the conductive portion, a wire width x of the metal wire and an interval y between the metal wires have values that satisfy following Conditional Expression (1) and Conditional Expression (2):

$$x \leq L/4250 \quad (1)$$

$$y \geq Tx/(100-T), \quad (2)$$

wherein L is a distance from a viewer to the extraction electrode or the connection electrode, T is a transmittance required in the planar light emitting body or the flexible printed wiring board, and the distance L and the transmittance T are respectively set to a predetermined value, provided that L, x, and y are in unit of mm, and T is in unit of %.

* * * * *